United States Patent
Neuhaus et al.

(10) Patent No.: US 6,578,606 B2
(45) Date of Patent: Jun. 17, 2003

(54) SOLENOID VALVE, IN PARTICULAR, A PRESSURE CONTROL VALVE

(75) Inventors: Rolf Neuhaus, Lohr/Main (DE); Bernd Urlaub, Steinfeld (DE); Friedrich Zapf, Karlstadt (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 09/921,292

(22) Filed: Aug. 2, 2001

(65) Prior Publication Data

US 2002/0083985 A1 Jul. 4, 2002

(30) Foreign Application Priority Data

Aug. 3, 2000 (DE) .......................................... 100 37 793

(51) Int. Cl.[7] ............................................. F15B 13/044
(52) U.S. Cl. ............................. 137/625.65; 137/625.68
(58) Field of Search ....................... 137/625.65, 625.68

(56) References Cited

U.S. PATENT DOCUMENTS

| | | | | | |
|---|---|---|---|---|---|
| 4,491,153 A | * | 1/1985 | Bartholomaus | ........ | 137/625.65 |
| 4,548,383 A | * | 10/1985 | Wolfges | ................ | 137/625.65 |
| 5,246,033 A | * | 9/1993 | Brehm et al. | .......... | 137/625.65 |
| 6,269,827 B1 | * | 8/2001 | Potter | .................... | 137/625.65 |
| 6,315,268 B1 | * | 11/2001 | Cornea et al. | ......... | 137/625.65 |
| 6,397,891 B1 | * | 6/2002 | Neuhaus et al. | ....... | 137/625.65 |
| 6,408,883 B2 | * | 6/2002 | Motoki et al. | .......... | 137/625.65 |

* cited by examiner

Primary Examiner—Gerald A. Michalsky
(74) Attorney, Agent, or Firm—Gudrun E. Huckett

(57) ABSTRACT

A solenoid valve has a housing having work, pressure, and tank connectors. An armature is movably arranged in the housing and cooperates with a coil. A slide is moveably arranged in the housing and has a hydraulic chamber connected to the work connector and connectable to the pressure connector. A plunger is positioned between the armature and the slide. The armature acts on the plunger which acts on the slide for moving the slide against a counter force. The plunger has a cross-section and the slide has a piston surface cooperating with the plunger, wherein the cross-section is smaller than the piston surface. In another embodiment, the slide has a first end, loaded by a supply pressure of the pressure connector, and a second end, loaded by a return pressure, so that the slide is hydraulically tensioned by the supply pressure and the return pressure.

9 Claims, 2 Drawing Sheets

SOLENOID VALVE, IN PARTICULAR, A PRESSURE CONTROL VALVE

BACKGROUND OF THE INVENTION

1. Field of the Invention

The invention relates to a solenoid valve, in particular, a pressure control valve, comprising an armature with which by means of a plunger the slide is movable against a counter force, or comprising an armature and a slide which can be moved against a counter force.

2. Description of the Related Art

In a known solenoid valve a plunger is fastened in the armature and forms the closing element of the valve in order to control the flow from a pressure connector connected to a pressure medium source to a connector which is connected to a tank or the low-pressure chamber. The armature separates two armature chambers from one another which are connected with one another by a channel which extends through the armature and the plunger. This prevents the deposition of dirt particles which could impair the function of the solenoid valve.

SUMMARY OF THE INVENTION

It is an object of the present invention to configure the solenoid valve of the aforementioned kind such that an optimal function of the valve is ensured.

In accordance with the present invention, this is achieved in that the plunger has a smaller cross-section than the piston surface of the slide cooperating therewith, wherein the slide has at least one hydraulic chamber which is connected with at least one work connector and is connectable with a pressure connector.

According to another embodiment, this object is achieved in accordance with the present invention in that the slide is hydraulically suspended or tensioned by being loaded from one end by the supply pressure and from the other end by the return pressure.

With the first embodiment of the solenoid valve according to the present invention it is possible to control large cross-sectional surfaces on the slide with relatively small solenoids without requiring a pilot control with control oil loss. The hydraulic chamber of the slide is connected with the work connector. When the solenoid valve is supplied with current, the slide is moved by means of the armature and the plunger such that the work connector is connected with the pressure connector. The solenoid valve according to the invention can be used advantageously in automatic transmissions or CVT-type (continuously variable transmission) systems.

In the second embodiment of the solenoid valve according to the invention, the slide is always hydraulically suspended or pre-tensioned. The supply pressure of the hydraulic medium is applied on one end of the slide, while the slide is loaded on the other end by the return pressure. In accordance with the pressure difference, the slide is thus correspondingly adjusted to the pilot control pressure. The adjustment of the slide, even in the case of contamination and thus increased frictional forces, is optimal. As a result of the pressure reduction between the supply pressure and the maximum pilot control pressure, the solenoid valve according to the invention is optimally stabilized despite sufficiently high adjusting forces acting on the slide.

DESCRIPTION OF THE PREFERRED EMBODIMENTS

Figure 1:
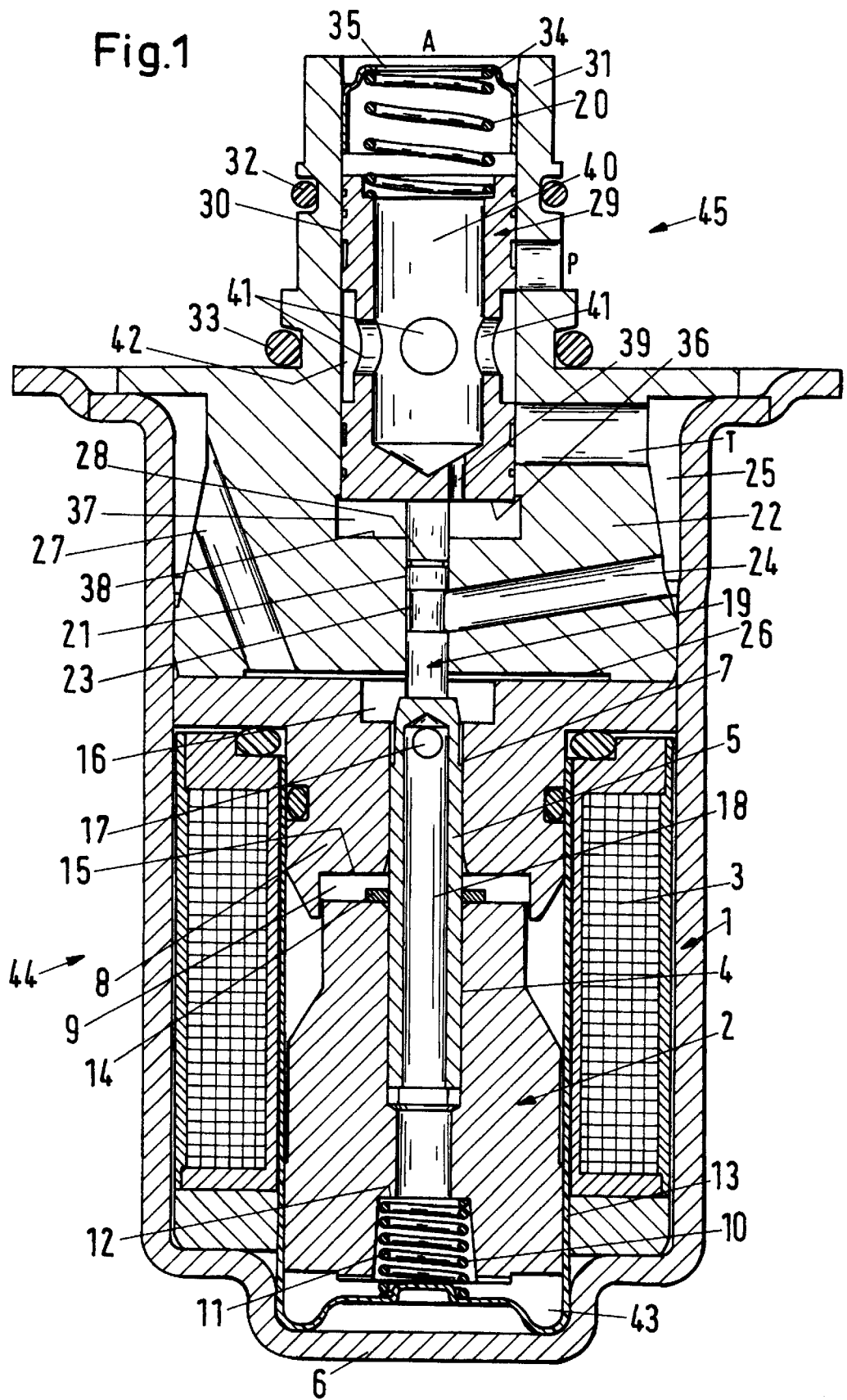
FIG. 1 is a sectional view of the first embodiment of the solenoid valve according to the invention.

The solenoid valve according to FIG. 1 has a cup-shaped housing 1 in which an armature 2 is moveably arranged. The armature 2 is surrounded by a coil 3 arranged within the housing 1. In a central bore 4 of the armature 2 a bushing 5 is fastened which is open at its end facing the bottom 6 of the housing 1. The bushing 5 projects axially past the armature 2 through a bore 7 provided in a magnet yoke 8. The magnet yoke 8 has a central depression 9 into which the armature 2 projects with one end. The opposite end of the armature 2 is provided with a depression 10 which receives a pressure spring 11. The spring 11 is supported with one end on the bottom 12 of the depression 10 and with the other end on the bottom of a cup-shaped insulation 13. The insulation cup 13 separates the armature 2 from the coil 3.

A seal 14 is positioned on the end of the armature 2 projecting into the depression 9 of the magnet yoke 8 and surrounds the bushing 5. When the armature 2 is moved, the seal 14 rests sealingly against the bottom 15 of the depression 9 of the magnet yoke 8.

The magnet yoke 8 is provided at the end face facing away from the armature 2 with a depression 16 into which the bushing 5 projects. The end of the bushing 5 positioned in this depression 16 is closed. Adjacent to this end, the bushing 5 is provided with at least one transverse bore 17 which connects the depression 16 with the interior chamber or bore 18 of the bushing 5.

A plunger 19 rests against the end face of the bushing 5. The plunger 19 can be attached to the end face of the bushing 5. However, it is also possible that the plunger 19 simply rests under the force of the pressure spring 20 against the end face of the bushing 5. The plunger 19 is guided in the receiving bore 21 of the housing part 22. The plunger 19 has at its circumference an annular groove 23 which is in communication with a channel 24 that extends through the housing part 22. Via this channel 24 the annular groove 23 is connected to the annular chamber 25 which surrounds the housing part 22 and is connected with the tank.

The housing part 22 has a shallow depression 26 at its end face facing the magnet yoke 8 which communicates by means of a further channel 27 extending through the housing part 22 with the annular chamber 25. The shallow depression 26 and the depression 16 of the magnetic yoke 8 together form a hydraulic armature chamber 16, 26.

The plunger 19, which is guided so as to be sealed by at least one annular seal 28 in the receiving bore 21, is connected with a hollow piston 29. The plunger 19 can simply rest against the hollow piston 29 or can be fixedly connected thereto. The hollow piston 29 forms a slide which is movably and sealingly guided in a bore 30 of a projection 31 of the housing part 22. By means of the projection 31 the solenoid valve is inserted into the bore (not illustrated) of a component, wherein the projection 31 is seated in a sealed arrangement in the bore by means of two annular seals 32, 33 which are spaced axially from one another.

The end of the slide 29 which is facing away from the plunger 19 is engaged by one end of a pressure spring 20; the other end of the spring 20 is supported on a closure element 34 which is inserted into the projection 31. The closure element 34 is fixedly seated in the projection 31 and has a central opening 35.

The hollow piston 29 limits with its piston surface or end face 36 facing the plunger 19 a pressure chamber 37. The chamber 37 is delimited at the opposite end by the bottom 38 of the bore 30. The pressure chamber 37 is penetrated centrally by the plunger 19 which has a smaller cross-section than the hollow piston 29 at its end facing the plunger 19. The pressure chamber 37 is connected by at least one axial bore 39 with the interior space 40 of the hollow piston 29 forming a hydraulic chamber (40). At a location spaced from the piston surface or end face 36, the interior space 40 of the hollow piston 29 is connected with an annular groove 42 provided on its outer side.

The housing projection 31 has a radial pressure connector P which, when the solenoid is not excited, is closed by the hollow piston 29. When the solenoid is supplied with current, the armature 2 is axially moved against the force of the pressure spring 20. The armature 2 moves the hollow piston 29 by means of the bushing 5 and the plunger 19. The annular groove 42 is thus connected with the pressure connector P so that the pressurized hydraulic medium can flow via the transverse bore 41 into the interior space or hydraulic chamber 40 of the hollow piston 29. From here, the hydraulic medium flows via the opening 35 in the closure element 34 to the work connector A and thus to the corresponding consumer.

The housing chamber 9 is in hydraulic flow communication with an armature chamber 43 via the bushing 5 and the solenoid armature 2. The control pressure is present at the work connector A provided at the end face (34). Depending on the position of the hollow piston 29 when the solenoid is excited, the pressure connector P is opened to a smaller or larger degree. Within the solenoid area, the tank connector T is provided which is connected with the annular chamber 25.

The pressure chamber 37 is loaded with the pressure which is present at the work connector A because the pressure chamber 37 is connected via the bore 39 and the interior space or hydraulic chamber 40 of the hollow piston 29 with the work connector A. Accordingly, the end result is that the control pressure acts only on the surface of the plunger 19 which is then compared with the magnetic force of the solenoid part 44 of the solenoid valve. The transfer onto the substantially greater end face 36 of the hollow piston 29 serves for generating an oil volume control through the hollow piston 29. The flow forces acting on the hollow piston 29 are received via the solenoid part 44 and the pressure surface by the plunger 19. The solenoid valve is configured as a pressure control valve in which the hollow piston 29 controls the control pressure at the working connector A by means of the control edges on the pressure connector P or the tank connector T toward the interior space or hydraulic chamber 40 of the hollow piston 29. The two pressure springs 11, 20 serve for pre-tensioning the hollow piston 29 and the armature 2 in order to keep the dead area of the pressure/strength of current characteristic line of the solenoid valve as small as possible.

The hydraulic pressure which is present at the work connector A is controlled as a result of the different surfaces of the hollow piston 29 and the plunger 19 loaded by the hydraulic medium within the pressure chamber 37 via the surface of the plunger 19. By means of the channel 27 the annular chamber 25 is connected with the hydraulic armature chamber 16, 26. The annular chamber 25 is in flow communication with the tank via the tank connector T. The plunger 19 is moreover decoupled between in the hydraulic main stage and the main solenoid part 44 by the channel 24 which connects the annular channel 23 of the plunger 19 with the annular chamber 25. Accordingly, dirt particles which, coming from the main control area with the hollow piston 29, reach the solenoid area, are returned via this channel 24 into the annular chamber 25 and thus to the tank (T). The pressure loss at the plunger 19 from the work connector A toward the solenoid part 44 is thus reduced via this channel 24.

In other respects, the solenoid part 44 of the solenoid valve is properly encapsulated (sealed) with regard to fluid flow.

As a result of the described configuration, it is possible to control with relatively small solenoids large cross-sectional surfaces on the hollow piston 29 without providing a true pilot control with control oil losses. The solenoid valve makes possible large controlled quantities without running the risk of contamination. The solenoid valve can be used preferably in an automatic transmission or CVT-type systems. The solenoid part 44 of the solenoid valve is integrated as the main stage into the solenoid valve.

The compensation of the liquid volumes between the two hydraulic armature chambers 16, 26 and 43 during switching of the solenoid valve is realized in that the hydraulic medium is moved back and forth via the transverse bore 17 and the interior chamber 18 of the bushing 5. Since the interior chamber 18 of the bushing 5 and the adjoining area of the bore 4 within the solenoid armature 2 are relatively long, dirt particles can be trapped reliably so that they cannot cause a functional disruption of the solenoid valve.

Figure 2:
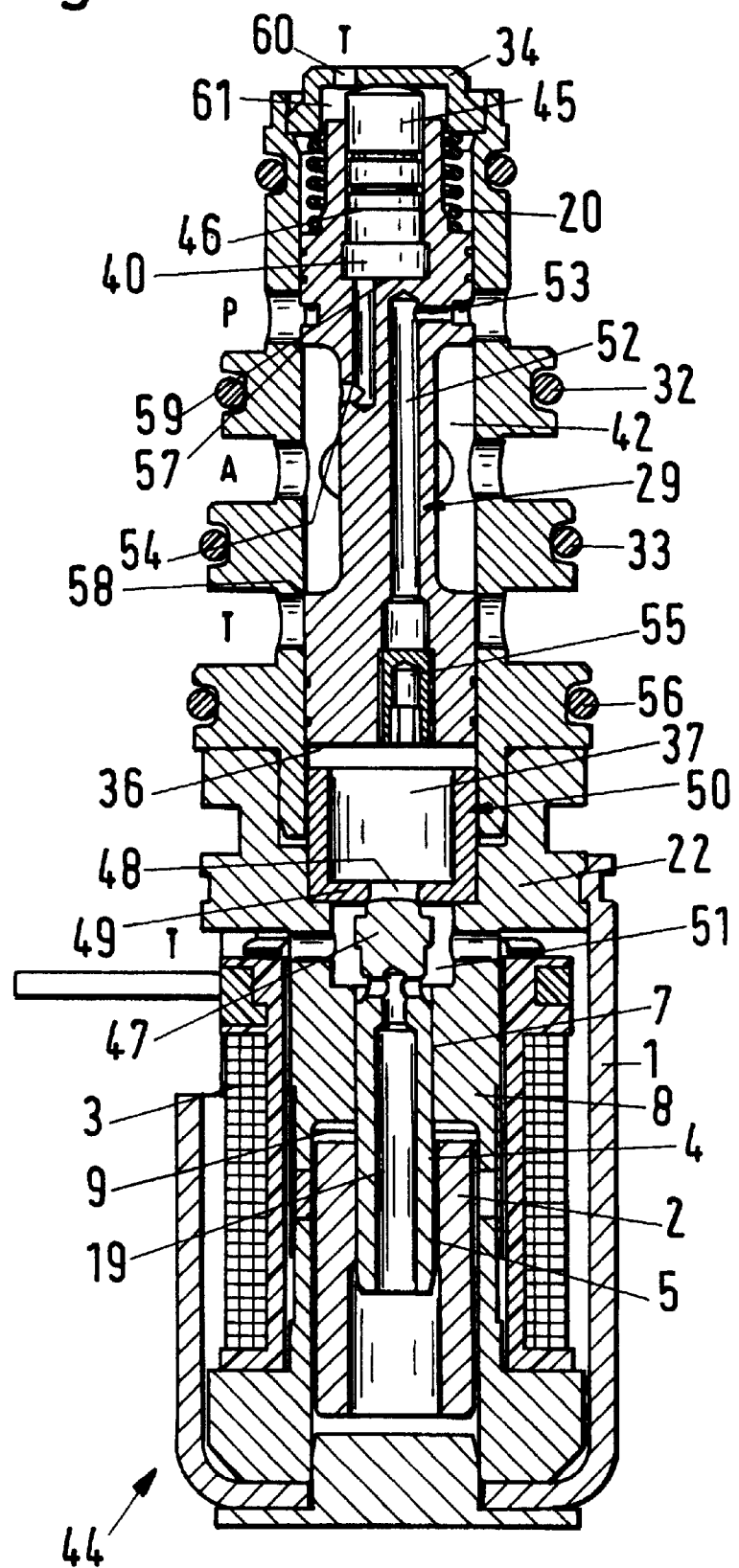
FIG. 2 is a sectional view of the second embodiment of the solenoid valve according to the invention.

The solenoid valve according to FIG. 2 is a pilot-controlled pressure valve in which the slide 29 is hydraulically suspended or pretensioned by being loaded on both ends. In the illustrated embodiment of FIG. 1, the slide 29 is pretensioned only by the pressure spring 20. In order to achieve the hydraulic tensioning of the slide 29, an auxiliary piston 45 is seated in the end of the slide 29 adjoining the closure element 34. The auxiliary piston 45 rests under the hydraulic pressure against the closure element 34 and is supported in a sealed fashion within the slide 29. The auxiliary piston 45 delimits the interior space 40 of the slide 29 which is loaded under the force of the pressure spring 20 in the direction toward the solenoid part 44. The auxiliary piston 45 has a pressure surface 46 which is smaller than the opposite end face 36 of the slide 29. For example, the pressure surface 46 of the auxiliary piston 45 can be only half the size of the end face 36. The pressure surface 46, for example, can also be only one third or one fifth of the surface of the end face 36 of the slide 29. Accordingly, the pilot control pressure acting onto the end face 36 of the slide 29 can operate also with a correspondingly small supply pressure. This not only contributes to an improved adjustment of the slide 29, for example, when contamination and/or higher frictional forces occur, but also serves for a higher stabilization as a result of the pressure reduction from the pilot control pressure to the supply pressure. This provides a minimal force gain and a higher stability. The instability which can be observed in conventionally pilot-controlled pressure control valves as a result of the internal high force gain does not occur in this solenoid valve without the adjusting forces which act on the slide 29 becoming so small that the slide could jam. The pressure reduction can occur depending on the surface ratios of the pressure surface 46 of the auxiliary piston 44 and the pressure surface 36 of the slide 29.

The solenoid part 44 has a housing 1 which receives the armature 2 and the coil 3 surrounding it. The solenoid armature 2 projects into the depression 9 of the magnet yoke 8. In the central bore 4 the bushing 5 is seated which projects through the bore 7 of the solenoid yoke 8. In the bushing 5 a plunger 19 in the form of the support pin is provided which supports on its end projecting axially past the bushing 5 a closing element 47 with which a central opening 48 in the bottom 49 of a cup 50 can be closed. The cup 50 limits the pressure chamber 37 which is limited at the other end by the end face 36 of the slide 29. The closing element 47 is positioned in a hydraulic chamber 51 which is provided between the bottom 49 of the cup 50 and the magnet yoke 8 and opens into the tank connector T.

The slide 29 has an axial bore 52 which is closed relative to the interior space 40. In the vicinity of the hydraulic chamber 40 at least one transverse bore 53 opens into the bore 52, and the bore 52 is connected by the at least one transverse bore 53 to the pressure connector P.

The slide 29 is provided with an annular groove 42 which forms a corresponding annular chamber into which at least one work connector A opens. The bore 54 provided in the slide 29 opens into the annular chamber 42 and connects the annular chamber 42 with the interior space (hydraulic chamber) 40. The bore 52 is provided in the vicinity of the pressure chamber 37 with a nozzle-like constriction 55. The pressure chamber 37 is in fluid communication with the transverse bore 53 via the bore 52.

The housing part 22 of the solenoid valve is inserted, in the same way as in the above described embodiment, into a bore (not illustrated) of a component in which the housing part 22 is sealingly seated by means of three annual seals 32, 33, 56 spaced apart from one another in the axial direction.

In the position illustrated in FIG. 2, the closing element 47 rests sealingly on the bottom 49 of the cup 50 and closes the opening 48. Accordingly, the pressure chamber 37 is separated from the tank connector T. The slide 29 is in a central position in which the work connector A is separated from the pressure connector P and from the tank connector T in the housing part 22. The slide 29 is always pressure-tensioned by the control pressure acting on the end face 36 and the return pressure acting in the opposite direction onto the pressure surface 46 of the auxiliary piston 45. The return pressure is assisted by the force of the pressure spring 20 which acts in the same direction as the return pressure. With this pressure tensioning system, an excellent adjustment of the slide 29 is ensured even when contamination and thus higher frictional forces are present.

The two main control edges 57, 58 on the slide 29 control the pressure from the pressure connector P to the work connector A and from the work connector A to the tank connector T of the housing part 22.

As a result of the hydraulic pressure acting on the pressure surface 46 in the interior space 40, the auxiliary piston 45 is always forced against the closure element 34 which is provided with at least one opening 60. By means of this opening 60, a hydraulic chamber 61 positioned between the slide 29 and the closure element 34 is connected with the tank T. Moreover, the hydraulic medium acts on the bottom 59 of the interior space 40 so that the slide 29 is loaded in the direction toward the solenoid part 44. By means of this pressure, the slide 29 is always adjusted according to the pilot control pressure in the pressure chamber 37. The bottom 59 of the interior space or hydraulic chamber 40 of the slide 29 has a smaller surface than the oppositely positioned end face 36 of the slide 29.

The solenoid valve operates normally by pilot control with the supply pressure P. Via the transverse bore 53 the pressurized hydraulic medium reaches the axial bore 52 of the slide 29. Via the nozzle 55 the pressurized hydraulic medium reaches the pressure chamber 37. The return control is realized by the closing element 47 of the solenoid part 44. Since a larger force is acting on the end face 36 of the slide 29 than on the oppositely positioned surface of the bottom 59 of the hydraulic chamber 40 plus the force of the pressure spring 20, the slide 29 is moved from the position illustrated in FIG. 2 against the force of the pressure spring 20. The control edge 57 opens the pressure connector P so that the hydraulic medium under pressure can reach via the annular chamber 42 the work connector A. At the same time, the control edge 58 closes the connection of the tank connector T to the work connector A. The return of the hydraulic medium is realized via the bore 54 to the end face 46 of the auxiliary piston 45. Accordingly, in the way described above, the slide 29 is always adjusted according to the pilot control pressure within the pressure chamber 37.

When the solenoid part 44 is actuated, the plunger 19 with the closing element 47 is moved back so that the opening 48 in the bottom 49 of the cup 50 is released. The hydraulic medium in the pressure chamber 37 can flow via the opening 48 to the tank connector T. Accordingly, the slide 29, as a result of the pressure drop within the pressure chamber 37, is moved in the downward direction (FIG. 2) so that the connection between the pressure connector P and the work connector A is closed and the connection from the work connector A to the tank connector T is opened. The hydraulic medium can thus flow back to the tank T.

The slide 29 is pressure-tensioned in any position. The pilot control pressure within the hydraulic chamber 37 acts onto one end face 36, while the return pressure acts on the bottom 59 of the interior space 40. This serves for an improved adjustment of the slide 29 even when contamination and thus higher frictional forces are present.

The pressure reduction between the supply pressure P and the maximum pilot control pressure within the pressure chamber 37, which depends on the surface ratio of the surface of the bottom 59 and the end face 36 of the slide 29, is an important advantage of the solenoid valve according to the invention. The pressure reduction serves for stabilizing the entire valve despite the fact that sufficiently high adjusting forces acting on the slide 29 are provided.

While specific embodiments of the invention have been shown and described in detail to illustrate the inventive principles, it will be understood that the invention may be embodied otherwise without departing from such principles.

What is claimed is:
1. A solenoid valve comprising:
 a housing (1, 22) having a work connector (A), a pressure connector (P), and a tank connector (T);
 an armature (2) moveably arranged in the housing (1, 22);
 a colt (3) arranged in the housing (1, 22) and acting on the armature (2);
 a slide (29) moveably arranged in the housing (1, 22) and having at least one hydraulic chamber (40) connected to the work connector (A) and configured to be connectable to the pressure connector (P);
 a plunger (19) positioned between the armature (2) and the slide (29), wherein the armature (2) acts on the plunger (19) and the plunger (19) acts on the slide (29) for moving the slide (29) against a counter force;
 wherein the plunger (19) has a cross-section and the slide (29) has a piston surface (36) cooperating with the plunger (19), wherein the cross-section is smaller than the piston surface (36);

a bushing (5) connected to the armature (2), wherein the plunger (19) interacts with the bushing (5), wherein the housing (1, 22) has a first armature chamber (16, 26) located at a first end of the armature (2) facing the slide (29), wherein the bushing (5) projects into the first armature chamber (16, 26);

wherein the housing (1, 22) has a second armature chamber (43) located at a second end of the armature (2) facing away from the slide (29), wherein the first and second armature chambers (16, 26; 43) communicate with one another; and wherein the armature (2) and the bushing (5) have at least one bore (4, 18) connecting the first and second armature chambers (16, 43) with one another.

2. The solenoid valve according to claim 1, wherein the work connector (A) is arranged coaxially with the slide (29).

3. The solenoid valve according to claim 1, wherein the pressure connector (P) extends radially relative to an axis of the slide (29).

4. The solenoid valve according to claim 1, wherein the slide (29), the plunger (19), the bushing (5), and the armature (2) are arranged coaxially to one another.

5. A solenoid valve comprising:

a housing (1, 22) having a work connector (A), a pressure connector (P), and a tank connector (T);

an armature (2) moveably arranged in the housing (1, 22);

a coil (3) arranged in the housing (1, 22) and acting on the armature (2);

a slide (29) moveably arranged in the housing (1, 22) and having at least one hydraulic chamber (40) connected to the work connector (A) and configured to be connectable to the pressure connector (P);

a plunger (19) positioned between the armature (2) and the slide (29), wherein the armature (2) acts on the plunger (19) and the plunger (19) acts on the slide (29) for moving the slide (29) against a counter force;

wherein the plunger (19) has a cross-section and the slide (29) has a piston surface (36) cooperating with the plunger (19), wherein the cross-section is smaller than the piston surface (36);

a bushing (5) connected to the armature (2), wherein the plunger (19) interacts with the bushing (5), wherein the housing (1, 22) has a first armature chamber (16, 26) located at a first end of the armature (2) facing the slide (29), wherein the bushing (5) projects into the first armature chamber (16, 26); and wherein the housing (1, 22) has an annular chamber (25) connected to the tank connector (T) and at least one first channel (27) configured to connect the first armature chamber (16, 26) with the annular channel (25).

6. The solenoid valve according to claim 5, wherein the housing (1, 22) has a second armature chamber (43) located at a second end of the armature (2) facing away from the slide (29), wherein the first and second armature chambers (16, 26; 43) communicate with one another.

7. The solenoid valve according to claim 6, wherein the armature (2) and the bushing (5) have at least one bore (4, 18) connecting the first and second armature chambers (16, 43) with one another.

8. The solenoid valve according to claim 5, wherein the housing (1, 22) has a receiving bore (21) receiving the plunger (19) and at least one second channel (24) connecting the receiving bore (21) with the annular chamber (25).

9. The solenoid valve according to claim 8, wherein the plunger (19) has an annular groove (23) and wherein the at least one second channel (24) opens into the annular groove (23).

* * * * *